Aug. 1, 1967  N. H. K. WISTINGHAUSEN  3,333,309
CORE CLAMP
Filed July 5, 1966
2 Sheets-Sheet 1
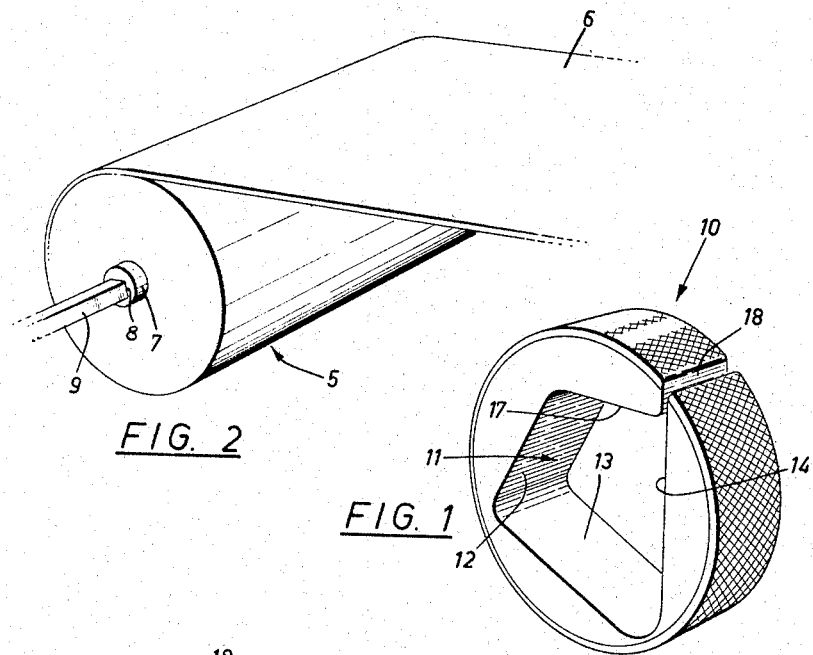
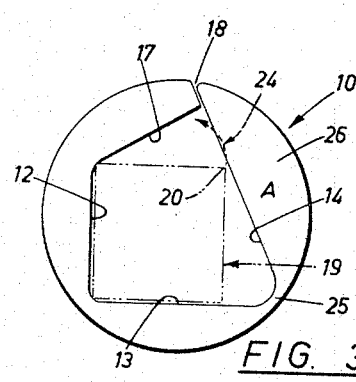
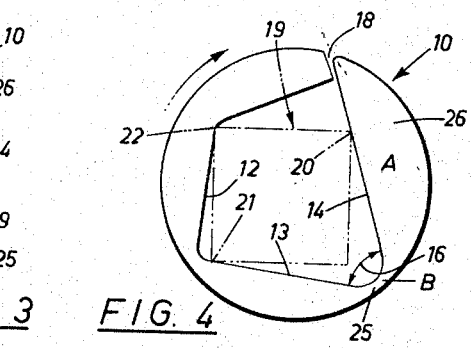
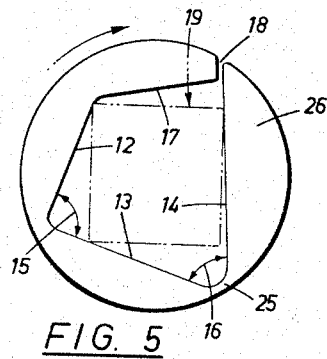
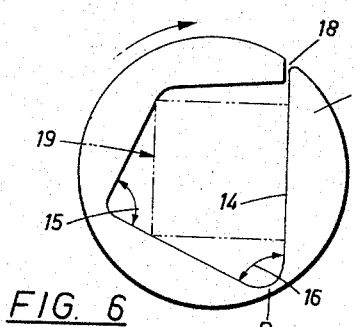
INVENTOR.
NIKOLAI H. K. WISTINGHAUSEN
BY W. G. Hopley.
Agent

United States Patent Office

3,333,309
Patented Aug. 1, 1967

3,333,309
CORE CLAMP
Nikolai Horst Kurt Wistinghausen, Lindsay, Ontario, Canada, assignor to Union Carbide Canada Limited, Toronto, Ontario, Canada, a Canadian company
Filed July 5, 1966, Ser. No. 562,911
17 Claims. (Cl. 24—255)

ABSTRACT OF THE DISCLOSURE

A clamping device for preventing the longitudinal displacement of a cylindrical feed roll mounted on a shaft of square cross-section. This device consists of a body of resilient material having an aperture of uniform cross-section defined by a first face, a second face and a third face, the first face and the second face forming a first angle which is substantially a right-angle, the second face and the third face forming a second angle which is an acute angle, the third face intersecting the hypothetical bisector of said first angle at a point whose distance from the vertex between the first face and the second face is slightly greater than the diagonal of said square cross-section, such that (a) the core clamp can be slid loosely over the shaft in a first orientation in which the first and second faces are parallel with the sides of the shaft, and (b) the shaft is tightly gripped by the core clamp when the latter has been turned with respect to the shaft from said first orientation to a second orientation in which the third face is parallel with two opposed sides of the shaft. A clamping device which does not require a tightening or loosening tool, lock handle or other projection is thereby obtained.

This invention relates to apparatus used in the processing of continuous bands of material, and has to do particularly with the clamping devices used to prevent longitudinal displacement, with respect to a supporting shaft, of a core upon which a continuous band of material is wound.

During processing operations like converting, printing, winding or unwinding performed on materials such as paper, cellophane, polyethylene or any other plastic cloth in the form of a continuous band of material, the material is in roll form during various stages of the process. Usually, the rolls of material are wound on a core, and whenever a roll is positioned on a machine for a processing operation, the core is mounted on a shaft or spindle.

The shafts used in industry have cross-sections of different shapes, but the most commonly used cross-sections are (1) circular, and (2) square.

This invention relates only to shafts of square cross-section. In square shaft mounting, the material is usually reeled on a core that has a square hole adapted to receive the square shaft. In this case, it is necessary to employ some kind of clamping device in order to prevent the core from sliding along the square shaft.

The clamps that are presently available for this purpose are secured to the shaft by means of a fastening device such as a screw, cam-lock, or other device, and suffer from at least two of the following three disadvantages.

Firstly, the manufacturing cost of a multiple component clamp is high.

Secondly, if the clamping fastener is a screw or other kind of fastener that requires a wrench or similar tool to lock and unlock, there is a loss of operating time involved in the use of the clamp. Also, tools are often lost or misplaced. Sometimes the machine operator tries to get the tool onto the clamp even before the machine has stopped completely, and this practice is unsafe. If the tool is left on the clamp and the machine is re-started, there is a danger that the tool will fly away as a projectile Thirdly, clamps that utilize a cam-lock, wedge lock or other kind of locking device require that an operating handle protrude from the clamp. This is undesirable since any clamp that is not round in shape is dangerous when revolving on a shaft at high speeds.

One object of this invention is to provide a clamp which is simple and economical to manufacture.

Another object of the invention is to provide a core clamp which does not require the use of a tool for tightening or loosening.

Yet another object of this invention is to provide a core clamp which does not require a locking handle or other projection protruding from the clamp.

An object of a preferred embodiment of this invention is to provide a core clamp which is cylindrical, and is coaxial with the shaft when the latter is spinning, such that no projections whatsoever are present.

The above and other objects are attained through the provision, for use on a shaft of square cross-section, of a core clamp comprising a body having an aperture of uniform cross-section defined by a first face, a second face adjacent the first face, and a third face, the first face and the second face forming a first angle which is substantially a right-angle, and the second face and the third face forming a second angle which is an acute angle. The third face intersects the hypothetical bisector of the first angle at a point whose distance from the vertex between the first face and the second face is slightly greater than the diagonal of said square cross-section, such that (a) the core clamp can be slid loosely over the shaft in a first orientation in which the first and second faces are parallel with the sides of the shaft, and (b) the shaft is tightly gripped by the core clamp when the latter has been turned with respect to the shaft from said first orientation to a second orientation in which the third face is parallel with two opposed sides of the shaft. The body is sufficiently resilient to enable the core clamp to be turned on the shaft between said first orientation and said second orientation. In a preferred embodiment of this invention, the body is split in the direction of the aperture in order to improve its resilience.

One embodiment of this invention is shown in the accompanying drawings, in which like numbers refer to like parts throughout the several views, and in which:

FIGURE 1 is a perspective view of a core clamp;

FIGURE 2 is a perspective view of a roll of material wound upon a core to which this invention is applicable;

FIGURES 3, 4, 5 and 6 are sequential views of the operation of the core clamp according to this invention.

Figure 7:
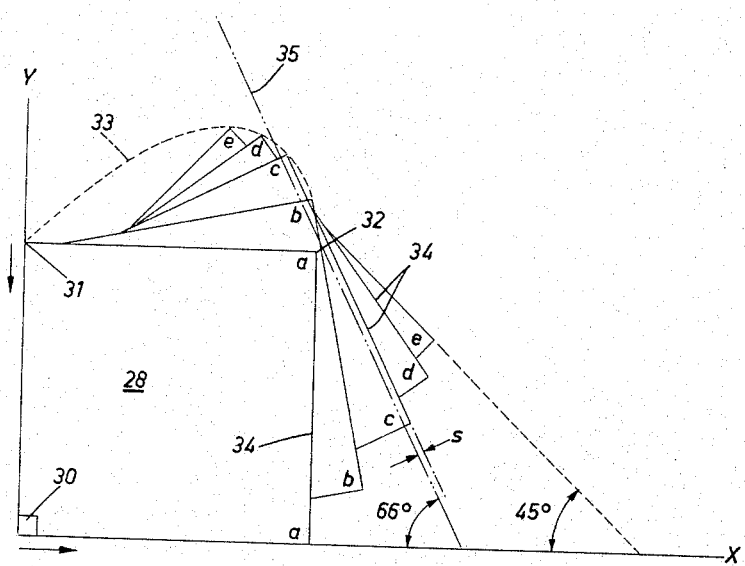
FIGURES 7 and 8 are diagrams for explaining the theory involved in the design of the core clamp according to this invention.

FIGURE 2 shows a roll 5 of material 6, such as paper, polyethylene, cloth, etc., wound onto a cylindrical core 7 having an axial hole or bore 8 of square cross-section. The core 7 is adapted to be mounted on a square shaft 9 of the usual type.

In order to prevent the core 7 from sliding longitudinally of the shaft 9, a core clamp is necessary, and the core clamp provided by this invention will now be described.

Turning to FIGURE 1, the core clamp is seen to comprise a body 10 consisting of a single piece of material. The body 10 has an aperture 11 of uniform cross-section, defined by a first face 12, a second face 13 adjacent the first face, and a third face 14, which cannot be seen in FIGURE 1, but is shown edge-on in FIGURES 3–6. The first face 12 and the second face 13 form a first angle 15 (FIGURES 5 and 6) which is substantially a right-angle. The second face and the third face form a second angle 16 which is an acute angle (FIGURES 5 and 6).

The body 10 has a fourth face 17 which merely permits the circumference of the cylindrical body 10 to be more or less closed, and which takes no part in the clamping action presently to be described. As shown in FIGURES 1 and 3–6, the cylindrical body 10 is split at 18.

Turning now to FIGURES 3, 4, 5 and 6, the way in which the core clamp of this invention is locked or tightened onto a shaft of square cross-section will now be explained. FIGURE 3 shows the core clamp 10 in what will be referred to hereinafter as a first orientation with respect to the square shaft 19. In this first orientation, the first face 12 and the second face 13 are parallel with the sides of the shaft 19. As can be seen, the upper right-hand corner 20 of the cross-section of the shaft 19 is spaced inwardly from the third face 14. Thus, when the body 10 is in the first orientation, it can slide freely along the square shaft 19. In order to lock or tighten the core clamp onto the square shaft 19, the clamp is manually turned clockwise (in the direction of the arrow). In FIGURE 4, which shows an intermediate position in the clockwise turning of the core clamp, it will be seen that, as the second face 13 slides leftwardly past the corner 21 and the first face 12 slides upwardly past the corner 22, the upper right-hand corner 20 begins to come in contact with the third face 14. When contact is made between the corner 20 and the third face 14, the core clamp will begin to resist further clockwise rotation by the operator, and a sufficient manual force must be applied in order to overcome this resistance. If there were no split 18 in the body 10, and if the latter were completely rigid, it would be theoretically impossible to rotate it to the position shown in FIGURE 5, because the locus of the corner point 20, shown in FIGURE 3 at 24, actually arcs to the right of the FIGURE 3 position of the face 14. However, because the body 10 is split at 18, and because of the formation of a thin, resilient web 25 between the second face 13 and the third face 14, the leg 26 of the body 10 bends to the right as it slides downwardly past the point 20. Note the large gap 18 in FIGURE 5.

FIGURE 6 shows the final position of the body 10 with respect to the square shaft 19, and this position will be referred to hereinafter as the second orientation of the body with respect to the shaft. It will be seen that the leg 26 presses flatly against the side of the square shaft 19, and it will be noticed that the split 18 has closed somewhat from the way it is shown in FIGURE 5. This means that, although the body 10 is tightly gripping the square shaft 19, the effect of the inward pressure applied does not tend to return the core clamp to its first orientation, since to do so it would have to move through a position (FIGURE 5) in which the leg 26 is more greatly stressed than it is in the second orientation (FIGURE 6).

The theory upon which the design of the core clamp according to this invention is based will now be explained with reference to FIGURES 7 and 8. FIGURE 7 shows sequential positions $a$, $b$, $c$, $d$ and $e$ of a square 28 being rotated counter-clockwise in such a way that its two corners 30 and 31 remain in contact, respectively, with two mutually perpendicular axes X and Y. It will be appreciated that the counter-clockwise rotation of the square 28 with respect to the stationary axes X and Y is analogous to the clockwise rotation of the core clamp with respect to the square shaft 19. Consequently, the following discussion will apply both to FIGURES 7 and 8 and to FIGURES 3–6, and the intermingling of the numerical references from all of these figures should not present any problems.

The locus or path followed by the upper right-hand corner 32 of the square 28 is shown as a dotted line 33. It will be noted that for any given position of the square 28, for example, position $d$, the upper right-hand corner 32 of the square must, as the square is rotating counter-clockwise into the position $d$ from the position $a$, pass outwardly of, or beyond, the final position of the edge 34 of the square 28 when the latter is in position $d$. The reason for this is the shape of the locus 33, which is on a 45° slope at its left-hand end, but has a vertical tangent at its other end. It is thus evident that, if the third face 14 of the aperture 11 were positioned such as to coincide exactly with the edge 34 when the latter was parallel with the third face 14, the leg 26 (FIGURES 5 and 6) would have to yield or bend rightwardly to permit the square shaft to rotate to the position in which the edge 34 was parallel with the third face 14. However, once in this parallel position, the leg 26 would not apply any appreciable pressure leftwardly against the edge 34 in order to grip the shaft. To permit such a gripping action to take place, the third face 14 is positioned in such a way that when unstressed, it is located slightly leftwardly of the position taken up by the edge 34 when the latter is parallel to the third face 14. If, for example, the angle of the third face 14 were chosen to make the latter parallel to the edge 34 in position $c$, then the position of the unstressed third face 14 would be that shown as a dot-dash line 35 in FIGURE 7. Naturally, the further left the position of the dot-dash line 35, the greater the gripping action of the core clamp on the square shaft. The third face 14 must not, however, be placed so far leftwardly that there is interference between the corner 32 and the third face 14. Thus, the inner limit to the position of the third face 14 is the location of the corner 32, whereas the outer limit is the position of the edge 34 when the latter is parallel to the wall 14.

The edge 34 can be seen in FIGURE 7 to move further and further away from the corner 32 (position $a$) as the square rotates counter-clockwise from position $a$ to position $e$, the latter representing a 45° angle. When the edge 34 is in the 45° position (position $e$), the edge 34 is at its maximum distance from the corner 32 in the position $a$.

It will also be noticed that, as the angle between the edge 34 and the axis X decreases from 90° to 45°, the distance rightwardly or outwardly that the third face 14 must yield during rotation increases. For example, the locus 33 arcs considerably further beyond the edge 34 in the position $e$ than it does in the position $c$.

Figure 8:
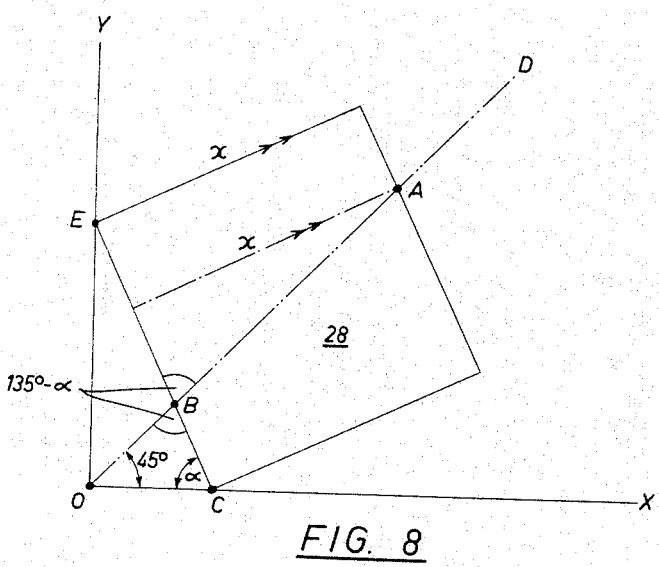

Using FIGURE 8, the mathematical expression for the inner and outer limits of the position of the third face 14 will now be derived. The variables in the equation are $x$, and the angle $\alpha$, representing, respectively, the length of one side of the square cross-section of the square shaft, and the angle between the third face 14 and the second face 13.

In FIGURE 8, the line OD is the bisector of the angle between the axis OY and the axis OX. Since the axes are mutually perpendicular, the angle between them is 90°, and the angle DOX is 45°. We wish to establish the mathematical expression for the maximum distance from O that the third wall 14 can intersect the bisector OD. This distance is clearly OA. In FIGURE 8, O represents the vertex between the first face 12 and the second face 13 of the core clamp shown in FIGURES 3–6.

We can divide OA into segments AB and BO, and determine the segments separately.

$$\because \angle BOC = 45°, \text{ and } \angle BCO = \alpha$$
$$\therefore \angle OBC = \angle EBA = 135° - \alpha$$
$$\sin \angle EAB = \frac{x}{AB}$$

from which:
$$AB = \frac{x}{\sin \angle EBA} = \frac{x}{\sin (135° - \alpha)}$$

Now, $OC = x \cos \alpha$
and by the sine rule,
$$\frac{\sin \angle OBC}{OC} = \frac{\sin \angle OCB}{BO}$$
$$\therefore BO = \frac{OC \sin \alpha}{\sin (135° - \alpha)} = \frac{x \cos \alpha \sin \alpha}{\sin (135° - \alpha)}$$

Thus $OA = \frac{x(1 + \cos \alpha \sin \alpha)}{\sin (135° - \alpha)}$

The minimum distance from O that the third wall 14 can intersect the bisector OD is obviously $x\sqrt{2}$.

It will be clear from the above discussion, and particularly from FIGURE 7, that any angle α which is less than 90° and which is at least 45°, could be employed in theory, provided the resilience and rigidity of the leg 26 (third face 14) were properly selected. (If the angle chosen were below 45°, it would be easier to rotate the square in the other direction.) It is preferred that the angle α lie somewhere between 60° and 70°, and 66° has been found to be particularly satisfactory when using mild steel for the core clamp. It will be obvious that the resiliency of the third face 14 can be adjusted not only by selecting a material of a different resilience, but also by varying the thickness of the web 25 (FIGURE 5) or the thickness of the clamp. It is obvious from FIGURE 7 that if an angle α of 45° were employed, it would mean a considerable straining of the material at the web 25. It is not, however, necessary that the material be strained to such an extent, since regardless of the angle α, the square shaft will not be returned to the first orientation (FIGURE 3).

It will be observed in FIGURE 6 that, when the core clamp is in the second orientation, the square shaft 19 is coaxial with the core clamp. This is particularly desirable, since during rotation there are no protrusions or bumps to project from the core clamp and present a danger hazard. Naturally, the core clamp could be in any other shape desired.

The fourth face 17 (FIGURES 1 and 3) plays no part in the locking operation of the core clamp, but is provided for dynamic balance considerations and to permit the periphery of the core clamp to be continuous. Since it is not essential to the invention, the fourth face 17 can be altered if desired.

It is emphasized that the gap or split 18 shown in FIGURES 1 and 3–6 not only need not be located precisely where it is there shown, but in certain cases can be dispensed with entirely. The only purpose served by the split 18 is to increase the resilience of the core clamp, and particularly to permit the leg 26 to yield outwardly during rotation of the core clamp about the square shaft. However, the same effect could be achieved by locating the split at the junction between the second face 13 and the third face 14, or at the junction between the first face 12 and the second face 13. If some material with greater elasticity than mild steel were used for the core clamp, for example certain plastic materials, it is conceivable that the split 18 could be eliminated altogether. All that is required for the practice of this invention is that the body of the core clamp be as a whole sufficiently resilient to permit rotation from the first orientation to the second orientation.

In FIGURES 3–6 it will be observed that the junctions between adjacent faces are rounded, and this is done in order to minimize local stresses. It is well known that stress concentration is considerably greater at a sharp corner than at a smooth rounded corner. It should be pointed out, however, that if the junction between the first face 12 and the second face 13 is too greatly rounded, the corner 21 (FIGURE 4) of the shaft 19 will be displaced upwardly to the right so far that the corner 20 will touch the third face 14 in the first orientation, and this should not occur. A rounded configuration is particularly important at the web 25, due to stress concentration considerations.

It will also be appreciated that although it is preferred that the angle between the first face 12 and the second face 13 be as nearly rectangular as possible, in certain applications a slight deviation from a 90° angle might be of advantage. In any event, it is clear that the functioning of this invention will not be impaired in the case of slight departures from 90° between the first face 12 and the second face 13 and for this reason the angle is referred to as being "substantially a right-angle."

It should also be pointed out that it would be a simple modification of the present invention to provide the core clamp with attachment means of the usual kind for securing the clamp to a core. Alternatively, it would not present any problems simply to manufacture the clamp as an integral portion of the core. These are obvious modifications of the present invention, and have not been shown in the accompanying drawings.

While a preferred embodiment of this invention has been disclosed herein, those skilled in the art will appreciate that changes and modifications may be made therein without departing from the spirit and scope of this invention as defined in the appended claims.

What I claim is:
1. For use on a shaft of square cross-section, a core clamp comprising:
   a body having an aperture of uniform cross-section defined by a first face, a second face adjacent the first face, and a third face,
   the first face and the second face forming a first angle which is substantially a right-angle,
   the second face and the third face forming a second angle which is an acute angle,
   the third face intersecting the hypothetical bisector of said first angle at a point whose distance from the vertex between the first face and the second face is slightly greater than the diagonal of said square cross-section, such that (a) the core clamp can be slid loosely over the shaft in a first orientation in which the first and second faces are parallel with the sides of the shaft, and (b) the shaft is tightly gripped by the core clamp when the latter has been turned with respect to the shaft from said first orientation to a second orientation in which the third face is parallel with two opposed sides of the shaft,
   the body being sufficiently resilient to enable the core clamp to be turned on the shaft between said first orientation and said second orientation.
2. A core clamp as claimed in claim 1, in which the distance of said point from said vertex is greater than $x\sqrt{2}$, but less than:

$$\frac{x[1+\cos\alpha.\sin\alpha]}{\sin(135°-\alpha)}$$

where $x$ = the length of one side of said square cross-section,
$\alpha$ = the said second angle.

3. A core clamp as claimed in claim 2, in which said second angle lies between about 60° and about 70°.
4. A core clamp as claimed in claim 3, in which the body is split in the direction of the aperture between the first face and the third face remote from the second face.
5. A core clamp as claimed in claim 4, in which the body is a circular cylinder of which the axis is parallel to the direction of said aperture, and of which the outer periphery is knurled.
6. A core clamp as claimed in claim 5, in which the aperture includes a fourth face at an obtuse angle to said first face and remote from said second face, the split in the body occurring between said fourth face and said third face.
7. A core clamp as claimed in claim 6, in which the junctions between adjacent faces are rounded in order to minimize local stresses, and in which the resilience of the body is located primarily at the junction between the second face and the third face.
8. A core clamp as claimed in claim 7, in which said second angle is approximately 66°.
9. A core clamp as claimed in claim 5 in which the shaft is coaxial with the cylinder when the core clamp is in said second orientation.
10. A core clamp as claimed in claim 1, in which said second angle is approximately 66°.

11. A core clamp as claimed in claim 1, in which the junctions between adjacent faces are rounded in order to minimize local stresses.

12. A core clamp as claimed in claim 1, in which the body is split in the direction of the aperture.

13. A core clamp as claimed in claim 12, in which the split occurs between the first face and the third face remote from the second face, and in which the resilience of the body is located primarily at the junction between the second face and the third face.

14. A core clamp as claimed in claim 1, in which the body is a circular cylinder of which the axis is parallel to the direction of said aperture.

15. A core clamp as claimed in claim 14, in which the outer periphery of the cylinder is knurled.

16. A core clamp as claimed in claim 14, in which the aperture includes a fourth face at an obtuse angle to said first face, and remote from said second face, the split in the body occurring between said fourth face and said third face.

17. A core clamp as claimed in claim 14, in which the shaft is coaxial with the cylinder when the core clamp is in said second orientation.

References Cited

UNITED STATES PATENTS

| | | | |
|---|---|---|---|
| 1,348,517 | 8/1920 | Porter | 85—50 X |
| 1,663,836 | 3/1928 | Hall. | |
| 1,868,726 | 7/1932 | Collier | 24—255 |

FOREIGN PATENTS

| | | |
|---|---|---|
| 181,566 | 3/1936 | Switzerland. |

WILLIAM FELDMAN, *Primary Examiner.*

D. GRIFFIN, *Assistant Examiner.*